(12) United States Patent
Augier et al.

(10) Patent No.: US 7,988,928 B2
(45) Date of Patent: Aug. 2, 2011

(54) TREATMENT OR HYDROTREATMENT REACTOR WITH A GRANULAR BED AND AN ESSENTIALLY LIQUID PHASE AND AN ESSENTIALLY GASEOUS PHASE FLOWING THROUGH THE BED

(75) Inventors: Frédéric Augier, Saint Symphorien d'Ozon (FR); Christophe Boyer, Charly (FR)

(73) Assignee: IFP, Cedex (FR)

( * ) Notice: Subject to any disclaimer, the term of this patent is extended or adjusted under 35 U.S.C. 154(b) by 219 days.

(21) Appl. No.: 12/503,200

(22) Filed: Jul. 15, 2009

(65) Prior Publication Data
US 2010/0015018 A1    Jan. 21, 2010

(30) Foreign Application Priority Data
Jul. 15, 2008   (FR) ...................................... 08 04057

(51) Int. Cl.
    *B01J 8/02*    (2006.01)
(52) U.S. Cl. ............ 422/220; 422/211; 261/19; 261/75; 261/94; 261/96; 261/97; 261/100
(58) Field of Classification Search .................. 422/211, 422/220; 261/19, 75, 94, 96, 97, 100
    See application file for complete search history.

(56) References Cited

U.S. PATENT DOCUMENTS

| | | | |
|---|---|---|---|
| 3,441,418 A | | 4/1969 | Nishikiori |
| 4,526,757 A | * | 7/1985 | Gupta ............................ 422/106 |
| 4,707,340 A | * | 11/1987 | Milligan ....................... 422/140 |
| 4,985,209 A | * | 1/1991 | Renard et al. ................. 422/140 |
| 5,942,197 A | * | 8/1999 | Gupta et al. .................. 422/605 |
| 6,123,323 A | | 9/2000 | Yoneda et al. |
| 2008/0085229 A1 | * | 4/2008 | Pennino ........................ 422/307 |

* cited by examiner

*Primary Examiner* — Walter D Griffin
*Assistant Examiner* — Huy-Tram Nguyen
(74) *Attorney, Agent, or Firm* — Antonelli, Terry, Stout & Kraus, LLP.

(57) ABSTRACT

The present invention relates to a treatment or hydrotreatment reactor comprising at least one granular bed (12), an essentially liquid phase (L) and an essentially gaseous phase (G) present in the bottom of the reactor and separated by an interface (38), and a distribution plate (20) with at least one main chimney (32) allowing circulation of liquid phase (L) towards the bed and at least one passage (30) for feeding gas phase (G) into said bed. According to the invention, plate (20) also comprises at least one mixed chimney (34) for circulation of the liquid phase towards the bed or for feeding the gas phase into said bed.

9 Claims, 1 Drawing Sheet

TREATMENT OR HYDROTREATMENT REACTOR WITH A GRANULAR BED AND AN ESSENTIALLY LIQUID PHASE AND AN ESSENTIALLY GASEOUS PHASE FLOWING THROUGH THE BED

FIELD OF THE INVENTION

The present invention relates to a reactor comprising a device for distributing at least one gas phase and at least one liquid phase circulating in an ascending co-current flow in this reactor.

It notably relates to a reactor with such a device arranged upstream from a reaction zone or a gas/liquid contact zone that can consist of a granular bed of solid particles, possibly catalytic particles.

It more particularly relates to a reactor intended for treatment or hydrotreatment of a fluid feedstock, such as catalytic treatment of distillates from heavy crudes.

BACKGROUND OF THE INVENTION

It is widely known that, in the reactor type with a fixed catalyst bed, it is necessary to distribute as homogeneously as possible the gas phase as well as the liquid phase.

It is also necessary to provide the most even and uniform distribution possible of these two phases all along the frontal section of this reactor so as to optimize gas-liquid contact in the reactor and to operate the various zones of this reactor in a substantially identical manner.

As it is already known from document U.S. Pat. No. 3,441,418, this distribution can be achieved by a distribution plate equipped with vertical chimneys and perforations whose purpose is to obtain a substantially uniform distribution of the gas phase and of the liquid phase over the entire section of a reactor that is in most cases of cylindrical shape.

This type of distribution plate also allows to distribute the gas phase through the perforations of the plate and the liquid phase through the chimneys.

U.S. Pat. No. 6,123,323 describes a distribution device that can be used in an ascending flow in a reactor supplied with a mixture of liquid and gas.

This device is made up of a distribution plate occupying all or part of the entire section of the reactor delimiting a volume wherein the gas and the liquid are separated. The gas then flows through orifices distributed over the entire section of the plate. The liquid flows separately through vertical chimneys running through the plate and extending below the liquid/gas interface or through fractions of the reactor section that are not covered by the plate.

This reactor, which is supplied with gas and liquid through a line located in the bottom of the enclosure, is technically interesting but it however involves quite considerable drawbacks.

In fact, operation is not optimized because the gas is poorly dispersed over the cross-section of the reactor, and a gas column generally rises at the centre thereof. This disturbs the gas-liquid interface below the distribution plate and leads to a poor gas distribution below the plate.

Furthermore, gas can possibly enter the chimneys in an unwanted manner. In case of a gas column, this results in a poor gas distribution with the presence of a larger proportion of this gas in the central zone of the plate.

Moreover, the gas disengagement thus creates significant disturbances that can induce flow pulsations and locally unbalance the gas distribution.

The present invention aims to overcome the aforementioned drawbacks by means of a catalyst bed reactor comprising a distribution plate that allows to obtain even distribution of the gas phase all along the section of the reactor without disturbing the liquid phase distribution, even in case of a gas-liquid interface disturbance.

SUMMARY OF THE INVENTION

The present invention therefore relates to a treatment or hydrotreatment reactor comprising at least one packed bed, an essentially liquid phase and an essentially gaseous phase present in the bottom of the reactor and separated by an interface, and a distribution plate with at least one main chimney allowing circulation of the liquid phase towards the bed and at least one passage for feeding the gas phase into said bed, characterized in that the plate also comprises at least one mixed chimney for circulation of the liquid phase towards the bed or for feeding the gas phase into said bed.

The mixed chimney can comprise a smaller height than the height of the main chimney and greater than the height of the passage.

The mixed chimney can comprise a cross-sectional area of fluid flow that is smaller than the cross-sectional flow area of the main chimney.

The mixed chimney can be a tube open at both ends and its cross-sectional area of fluid flow can be the diametral section of this tube.

The mixed chimney can be a tube open at both ends and its cross-sectional area of fluid flow can be a restriction of the diametral section of this mixed chimney.

The restriction can be a hollow washer arranged at one end of the mixed chimney.

The mixed chimney can be a tube closed at the lower end thereof and the cross-sectional flow area of this chimney can be at least one orifice provided in the peripheral wall of this chimney.

The main chimney can be housed coaxially in a hole provided in said plate and of greater diametral dimension than said chimney.

A mixed chimney can be arranged between the main chimney and the hole and coaxially thereto.

BRIEF DESCRIPTION OF THE FIGURES

Other features and advantages of the invention will be clear from reading the description hereafter, given by way of non limitative example, with reference to the accompanying figures wherein.

DETAILED DESCRIPTION

Figure 1:
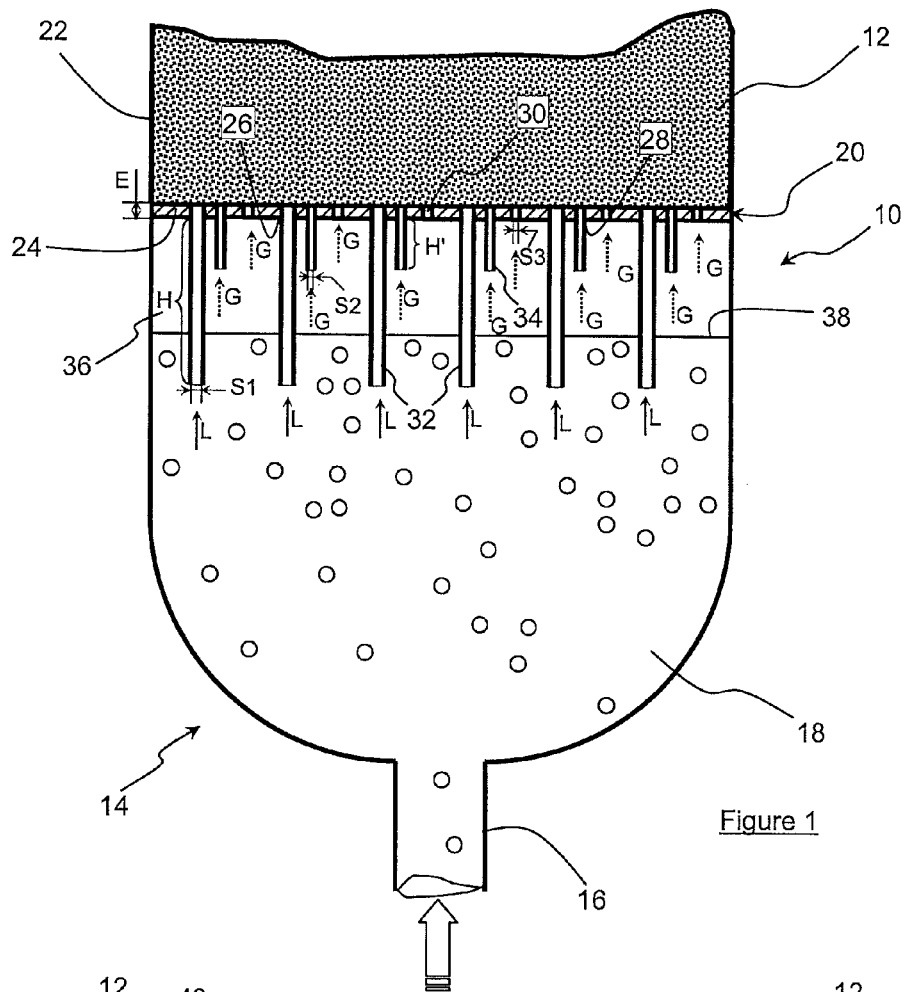
FIG. 1 is a partial axial sectional view of a reactor according to the invention comprising a distribution plate.

In FIG. 1, closed reactor 10, preferably of vertical elongate tubular shape, generally comprises in the upper part thereof means for supplying products (not shown) allowing to form at least one granular bed 12.

What is referred to as granular bed is a set of solid particles having the shape of grains whose dimensions are of the order of some millimeters and having advantageously a catalytic activity allowing to form a catalyst bed made up of fresh catalyst as well as regenerated catalyst.

Similarly, it is clear that the term reactor used above relates to the enclosures as well as the columns.

This reactor comprises, in the area of its bottom 14, preferably in the median zone thereof, a line 16 delivering a supply mixture 18 (or feedstock) of a gas phase and of a liquid phase.

Advantageously, the gas phase comprises a mixture containing pure hydrogen, or a mixture containing pure hydrogen, as well as residual hydrogen and vaporized hydrocarbons, whereas the liquid phase essentially comprises hydrocarbons.

The supply mixture can possibly comprise other phases such as water with air or oxygen, one or more hydrocarbons with air or oxygen.

The granular bed is delimited in the lower part of this reactor by a transverse perforated plate 20 arranged at a distance from bottom 14 of the reactor, which extends up to peripheral wall 22 thereof and whose purpose is explained in the description hereafter.

As it is widely known, such a reactor allows distribution and mixing of a stream of gas and of liquid in this reactor operating under ascending flow conditions. In order to obtain the desired catalytic reaction, it is thus necessary to achieve a gas/liquid/solid reaction contact. The catalyst of the granular bed is therefore kept immobile in the reactor or it is ebullated by the gas/liquid flow.

As can be seen in FIG. 1, distribution plate 20 delimits granular bed 12 while being arranged downstream from delivery line 16 and bottom 14 of the reactor.

This plate consists of a plane plate 24 occupying the entire section of the reactor up to its peripheral wall 22.

This plate 24 comprises a multiplicity of holes 26, 28, 30 provided therethrough. Holes 26 receive, in a tight manner, vertical hollow tubes 32 open at both ends,—referred to in the description hereafter as "main chimney"—, and intended to be traversed by the essentially liquid phase L of the supply mixture. Holes 28 are intended to receive, in a tight manner, vertical hollow tubes 34 also open at both ends, referred to as "mixed chimney". These mixed chimneys are traversed by either the essentially liquid phase L of the supply mixture or by the essentially gaseous phase G of the supply mixture. Holes 30 of plate 24 come as they are, preferably without hollow tubes, and they form passages traversed by the essentially gaseous phase G of the mixture.

The distribution plate thus consists of a series of main chimneys 32, of mixed chimneys 34 and of passages 30.

This plate thus allows communication of the gaseous and liquid fluids from the reactor bottom to the granular bed.

Axial height H of main chimneys 32 is greater than axial height H' of mixed chimneys 34, which itself is greater than the height of passages 30, which here merges with thickness E of plate 24. Heights H and H' are considered between the lower face of plate 24 and the open lower end where the fluid is introduced, respectively of the main chimney and of the mixed chimney.

The cross-sectional flow area S1 of main chimneys 32, considered radially, is preferably greater than the cross-sectional flow area S2 of mixed chimneys 34 and than cross-sectional flow area S3 of passages 30. Advantageously, cross-sectional areas S2 and S3 are equal to one another but they can be different while being smaller than cross-sectional area S1.

Here, cross-sectional areas S1 to S3 correspond to the open cross-sectional areas through which the fluid (gas or liquid) circulates towards bed 12. Cross-sectional areas S1 and S2 are considered at the level of the inner diametral sections of the tubes forming the main 32 and mixed 34 chimneys, and cross-sectional area S3 corresponds to the diametral section of passages 30.

Of course, the passages, the chimneys and the holes provided with these chimneys can have sectional geometries of any shape, identical or different from one another, of circular, elliptic, or any shape.

Similarly, the number, the layout and the size of chimneys 32, 34 and of passages 30 on plate 24 are selected according to any technique known to the person skilled in the art depending on the desired minimum and maximum operating values of the gas flow rate.

More precisely, whatever the gas flow rate operating range, this should allow formation of a gas overhead 36 below plate 20 and of a liquid/gas interface 38 located above the lower ends of main chimneys 32.

Preferably, as shown by way of example in FIG. 1, main chimneys 32 are traversed by liquid phase L of the mixture and the mixed chimneys, as well as passages 30, by gas phase G of this mixture. The lower ends of main chimneys 32 are therefore plunged in supply mixture 18 contained in bottom 14 of the reactor and the upper ends of these chimneys communicate with granular bed 12.

Similarly, the lower ends of mixed chimneys 34 end into gas overhead 36 whereas their upper ends communicate with granular bed 12.

Passages 30 allow to communicate gas overhead 36 with granular bed 12.

Advantageously, as it is already known, it is possible to provide a space between plate 20 and a grate supporting the granular bed.

This allows to limit the pressure drop of the plate in cases where the liquid and/or gas phases circulate at high velocities.

The terms "greater than" and "smaller than" used in the present description should be considered in connection with the diagram of the reactor as illustrated in FIG. 1.

During operation of this reactor, the supply mixture is fed into bottom 14 of the reactor through line 16. As this mixture ascends towards distribution plate 20, the gas phase contained therein is disengaged from the mixture. This disengaged gas phase gets as far as below plate 20 and forms gas overhead 36, with a gas/liquid interface 38 between this gas overhead and the degassed liquid phase from the supply mixture.

Of course, as already mentioned above, gas overhead 36 results from the pressure drop achieved by the various chimneys and passages whose number, dimensions and configurations are so determined that interface 38 is located, at best, above the lower ends of main chimneys 32 and below the lower ends of the mixed chimneys and, at worst, above the lower ends of the mixed chimneys without reaching the lower face of plate 20.

Thus, in the configuration of FIG. 1, degassed liquid phase L flows through main chimneys 32 and ends in bed 12, while disengaged gas phase G of overhead 36 circulates both through mixed chimneys 34 and passages 30 prior to ending also in bed 12.

These liquid and gas phases that have been advantageously distributed in a homogeneous manner all along plate 20 flow through the bed in an ascending motion to achieve the desired chemical reaction and eventually leave it through any means known to the person skilled in the art.

Of course, in the reactor configuration where interface 38 is located above the lower ends of mixed chimneys 34, the gas phase of overhead 36 only flows through passages 30 whereas the degassed liquid phase flows both through main chimneys 32 and mixed chimneys 34 prior to ending in bed 12.

This plate thus allows higher flexibility of use in terms of gas and liquid flow rates due to the presence of two chimney types.

Furthermore, this plate allows to meet the reactor compactness requirements by using low-height chimneys.

Besides, this reactor makes it possible to use a large number of gas circulation channels, notably when the gas flow rate increases, while preventing gas coalescence.

Figure 2:
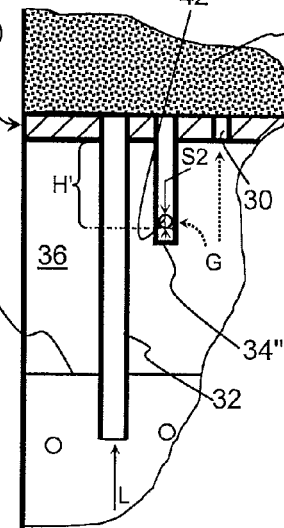
FIG. 2 is a large-scale fragmentary view of a variant of the reactor according to the invention.

The variant of FIG. 2 is different from FIG. 1 in that mixed chimneys 34' comprise a diametral section that is identical to that of the main chimneys and have a cross-sectional flow area S2 that is smaller than cross-sectional flow area S1 of main chimneys 32.

This smaller cross-sectional flow area is obtained by means of a restriction 40 carried by mixed chimneys 34'. Advantageously, this section restriction consists of a preferably centrally hollow washer whose outside diameter merges with the inside diameter of the tube forming the chimney and whose inside diameter allows to define cross-sectional flow area S2.

Preferably, this restriction is located at one or the other of the ends of the mixed chimneys, but it can also be located at any point between the two ends of these chimneys.

Figure 3:
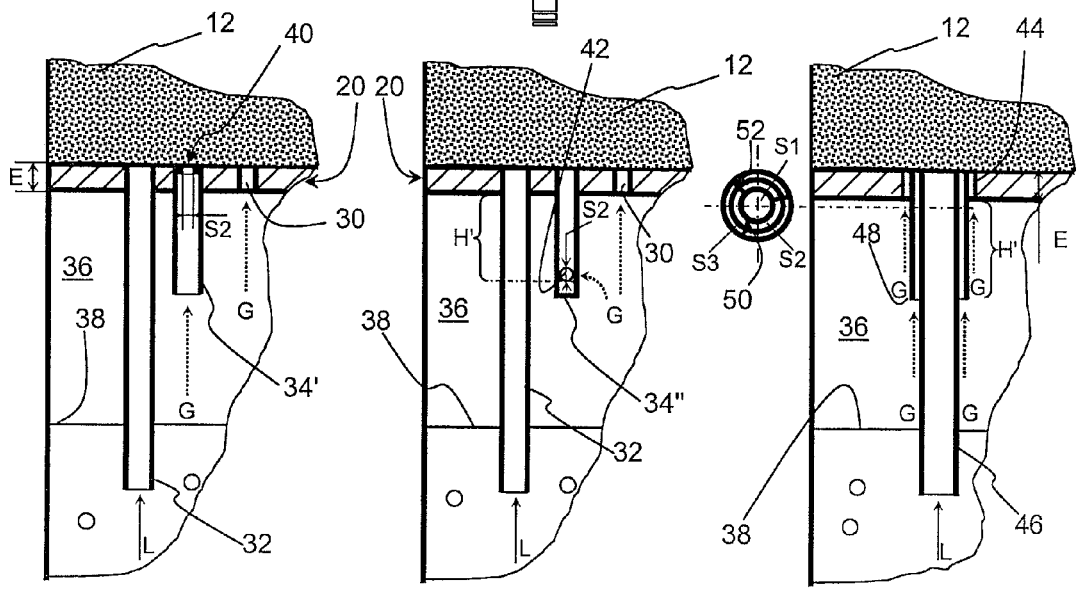
FIG. 3 is another large-scale fragmentary view of another variant of the reactor according to the invention.

In the variant of FIG. 3, the lower ends of mixed chimneys 34" in the direction of the reactor bottom are closed whereas the upper ends still communicate with granular bed 12. To provide communication of gas overhead 36 with bed 12, the peripheral wall of the mixed chimneys is provided with at least one orifice 42. This orifice, which is circular here, comprises a cross-sectional flow area S2 whose extent corresponds to that of FIGS. 1 or 2.

It is thus through this orifice, whose lowest point determines with the lower face of plate 24 the height H' of this chimney, that the gas phase of overhead 36 is introduced prior to flowing through mixed chimneys 34 and ending in bed 12.

Of course, a multiplicity of orifices 42 arranged circumferentially, one next to the other, or axially, one above the other, or with a combination of these two orifice layouts, can be provided.

Similarly, the orifice can be of different shape than the circular shape, such as slots.

Figure 4:
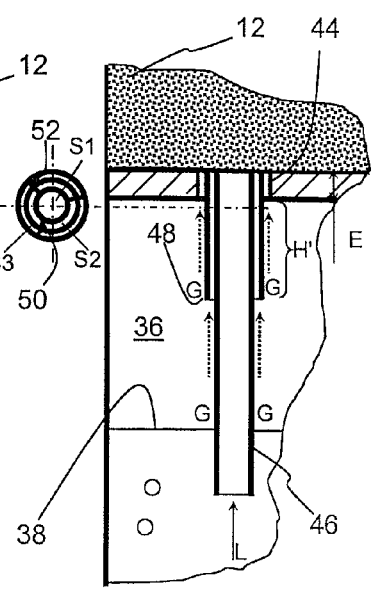
FIG. 4 is another large-scale fragmentary view of a third variant of the reactor according to the invention.

In the variant of FIG. 4, plate 24 is provided with holes 44, preferably circular, coaxially housing both the main chimneys and the mixed chimneys, and forming the aforementioned passages.

As can be seen in this figure, main chimneys 46 and mixed chimneys 48 are housed coaxially one in the other while being arranged coaxially to holes 44. These holes 44 therefore have a greater radial dimension than the radial dimension of mixed chimneys 48, which themselves have a greater radial dimension than main chimneys 46.

Similarly, height H of the main chimneys is greater than height H' of the mixed chimneys, which is itself greater than the height of holes 44, merging here with thickness E of plate 24.

Advantageously, the upper ends of the main and mixed chimneys are housed in hole 44 with their upper ends arranged in the same horizontal plane, as is more clearly visible in FIG. 4.

Of course, the person skilled in the art can consider any means allowing assembly of the various chimneys and of the hole, such as, for example, radial braces 50 welded between the outer periphery of the main chimney and the inner periphery of the mixed chimney, as well as braces 52 welded between the outer periphery of the mixed chimney and the inner periphery of hole 44.

In this configuration, cross-sectional flow area S1 corresponds to the diametral section of the main chimney, cross-sectional flow area S2 corresponds to the transverse areal extent between the outer periphery of the main chimney and the inner periphery of the mixed chimney, and cross-sectional flow area S3 corresponds to the transverse areal extent between the outer periphery of the mixed chimney and the periphery of hole 44.

As mentioned above in connection with FIGS. 1 to 3, flow area S1 is greater than flow area S2, which is itself greater than or equal to flow area S3.

Thus, the lower ends of main chimneys 46 are plunged in the degassed liquid phase and the upper ends open into granular bed 12, thus allowing the liquid phase to flow towards this granular bed. Flow section S2 between the main chimneys and the mixed chimneys, as well as flow section S3 between the mixed chimneys and holes 44, allow the gas phase to circulate and to flow from gas overhead 36 to bed 12.

The present invention is not limited to the embodiment examples described, and it encompasses any variant and equivalent.

Notably, in replacement of the supply mixture as described above, it is possible to consider feeding liquid phase L into the bottom of the reactor through a first supply means and injecting gas phase G below the distribution plate through another supply means so as to create a gas overhead and a liquid/gas interface.

The invention claimed is:

1. A treatment or hydrotreatment reactor comprising at least one packed bed, an essentially liquid phase and an essentially gaseous phase present in the bottom of the reactor and separated by an interface, a distribution plate with at least one main chimney allowing circulation of the liquid phase towards the bed and at least one passage for feeding the gas phase into said bed, characterized in that plate also comprises at least one mixed chimney for circulation of the liquid phase towards the bed or for feeding the gas phase into said bed.

2. A treatment or hydrotreatment reactor as claimed in claim 1, characterized in that mixed chimney comprises a smaller height than the height of main chimney and greater than the height of passage.

3. A treatment or hydrotreatment reactor as claimed in claim 1, characterized in that mixed chimney comprises a cross-sectional area of fluid flow that is smaller than the cross-sectional flow area of main chimney.

4. A treatment or hydrotreatment reactor as claimed in claim 3, characterized in that mixed chimney is a tube open at both ends and its cross-sectional area of fluid flow is the diametral section of this tube.

5. A treatment or hydrotreatment reactor as claimed in claim 3, characterized in that mixed chimney is a tube open at both ends and its cross-sectional area of fluid flow is a restriction of the diametral section of this mixed chimney.

6. A treatment or hydrotreatment reactor as claimed in claim 5, characterized in that the restriction is a hollow washer arranged at one end of mixed chimney.

7. A treatment or hydrotreatment reactor as claimed in claim 3, characterized in that the mixed chimney is a tube closed at the lower end thereof and the cross-sectional flow area of the mixed chimney is at least one orifice provided in the peripheral wall of this chimney.

8. A treatment or hydrotreatment reactor as claimed in claim 1, characterized in that main chimney is housed coaxially in a hole provided in said plate and of greater diametral dimension than said chimney.

9. A treatment or hydrotreatment reactor as claimed in claim 8, characterized in that a mixed chimney is arranged between main chimney and hole, and coaxially thereto.

* * * * *